Jan. 14, 1941. M. EVELEV 2,228,447
VEGETABLE HARVESTER
Filed Jan. 15, 1940 2 Sheets-Sheet 1
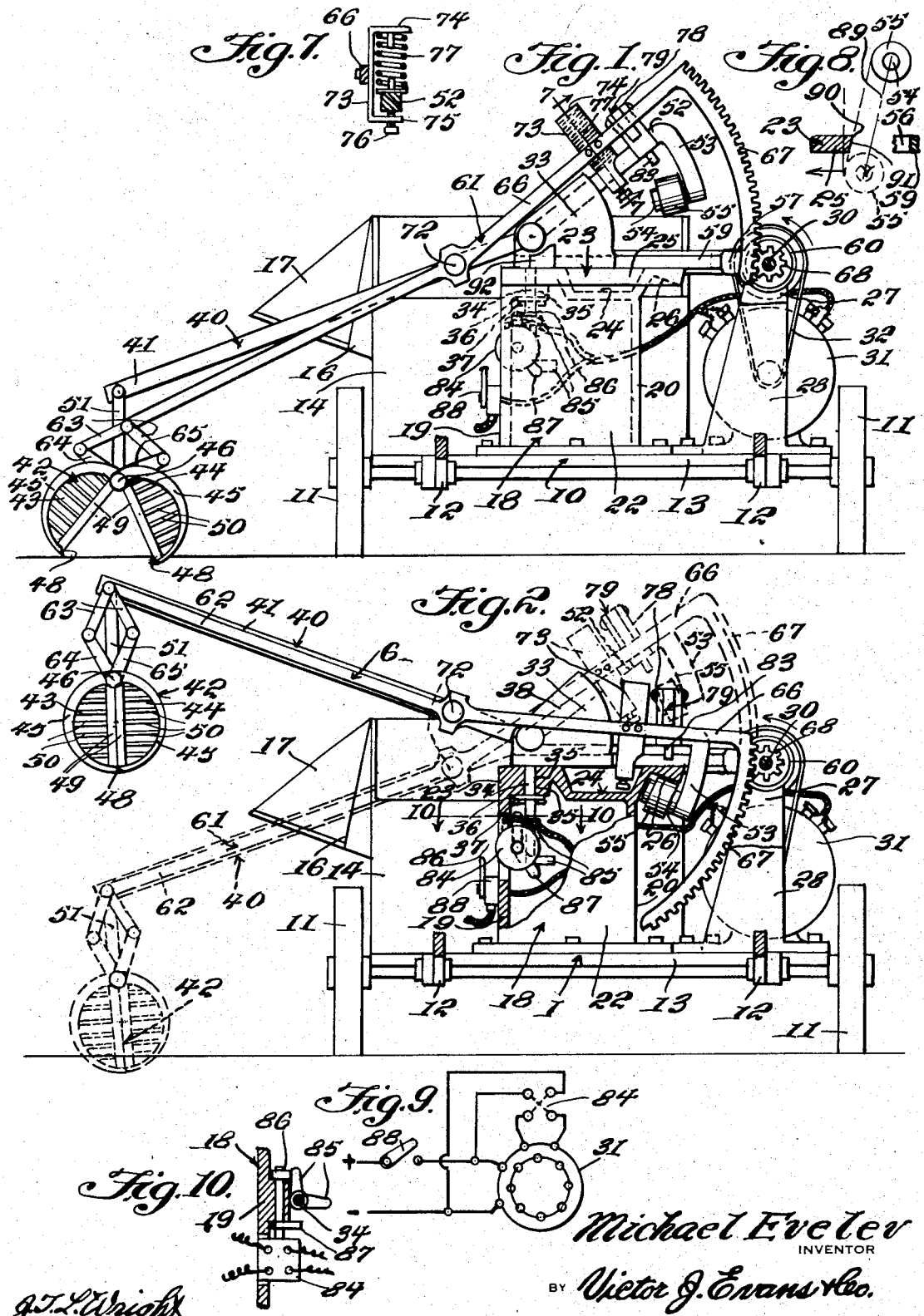
Michael Evelev
INVENTOR
BY Victor J. Evans & Co.
ATTORNEYS
J. L. Wright
WITNESS

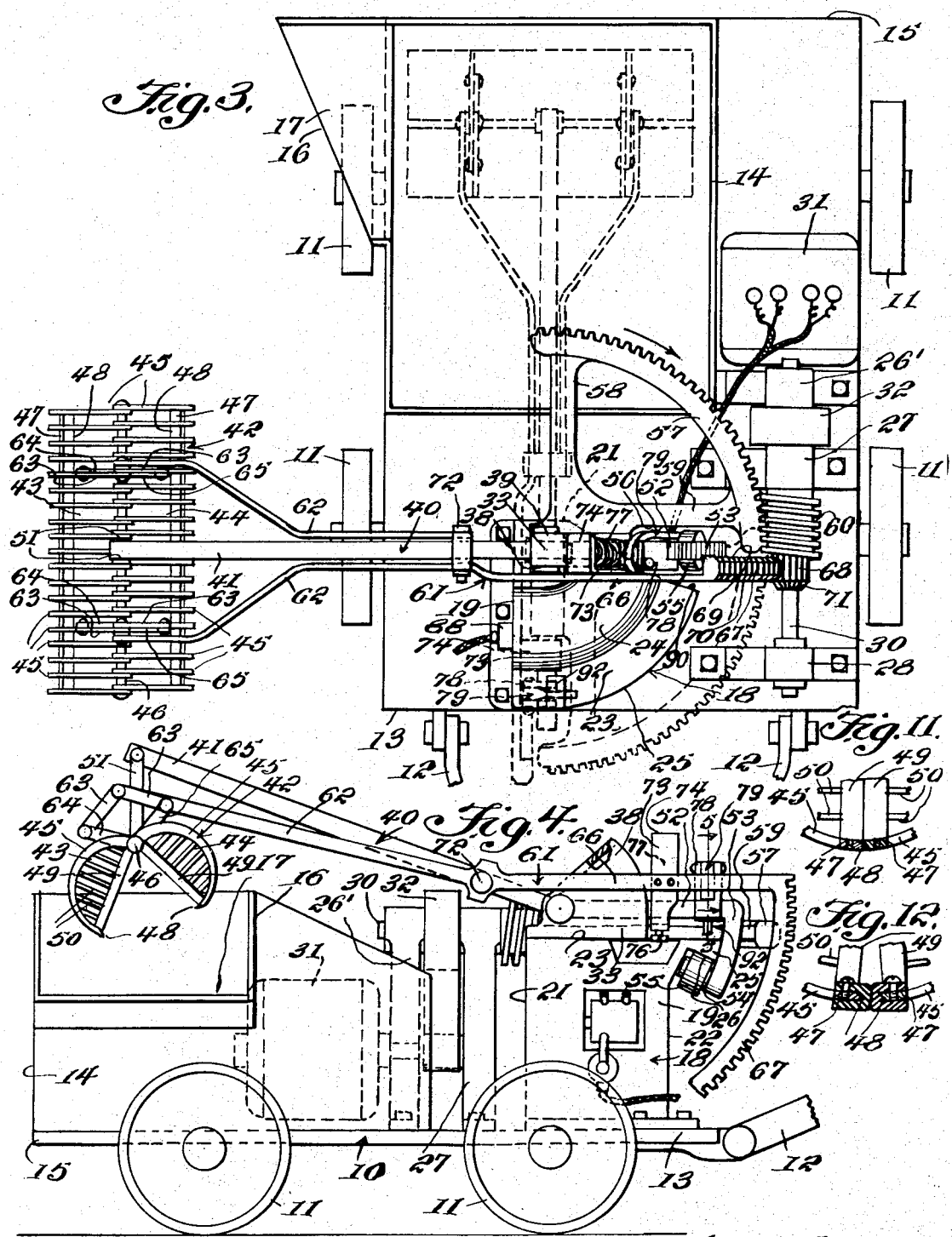

Patented Jan. 14, 1941

2,228,447

UNITED STATES PATENT OFFICE 2,228,447

VEGETABLE HARVESTER

Michael Evelev, Lebanon, Pa.

Application January 15, 1940, Serial No. 313,992

7 Claims. (Cl. 55—108)

My invention relates broadly to new and useful improvements in agricultural apparatus, and more particularly to a device for harvesting or gathering vegetables.

An important object of my invention is to provide a vegetable harvester that is automatic in its action to remove the desired portion of the vegetable from the ground and to deposit the same in a suitable receptacle.

Another object of my invention is to provide a vegetable harvester which includes a clamshell bucket adapted to have attachments applied thereto in a manner to permit the same to easily and expeditiously dig up the vegetables growing under the ground, such as potatoes, beets, carrots, etc., or to pick or pull the top portion of vegetables from the ground, as in the case of cabbages, celery, etc.

Still another object of my invention is the provision of an agricultural apparatus of the above-mentioned character that is adapted to operate in a comparatively rapid manner and that may be easily controlled and operated by one man.

Other objects and advantages of my invention will be apparent during the course of the following description.

In the drawings, forming a part of this specification, and wherein like numerals are employed to designate like parts throughout the same:

Figure 1 is a front elevation of a device embodying my invention, and showing the bucket in the lowered position, Figure 2 is a view similar to Figure 1, but showing the bucket in an elevated position, Figure 3 is a top plan view of my device, Figure 4 is a side elevation of the same, Figure 5 is a fragmentary sectional view, taken on the line 5—5 of Figure 4, and showing the bucket releasing clamp in a released position, Figure 6 is a view similar to Figure 5, and showing the clamp in the bucket closing position, Figure 7 is a vertical sectional view, taken on the line 7—7 of Figure 1, Figure 8 is a diagrammatic view illustrating the travel of the track engaging roller during the elevation of the bucket, Figure 9 is a diagrammatic view of the motor and the switch means for controlling the same, Figure 10 is a view taken on the line 10—10 of Figure 2, Figure 11 is a fragmentary perspective view illustrating the bucket as adapted for cutting, and Figure 12 is a view similar to Figure 11 but showing the jaws adapted to pick or pull the vegetables from the ground.

In the accompanying drawings, wherein for the purpose of illustration is shown a preferred embodiment of my invention, the numeral 10 designates a carriage mounted upon the wheels 11 and provided with spaced bars 12 pivoted to the forward end 13 thereof. The wheels 11 permit the carriage to be easily moved from place to place, and the bars 12 provide means for attaching the carriage to a tractor, or the like (not shown). A box like receptacle 14 is mounted on the rearward end 15 of the carriage, which receptacle being adapted to receive the vegetables deposited therein by means of a clamshell bucket, the construction and operation of which is presently to be described in detail. The receptacle is formed with a laterally extending chute 16 which is formed with an open top 17 whereby any vegetables prematurely or belatedly dropped from the bucket will be conducted into the receptacle.

A platform 18 is bolted, or otherwise secured, to the carriage centrally thereof and forwardly of the receptacle, said platform being formed with vertical side walls 19 and 20 and end walls 21 and 22 the upper edges of which are bridged by a cover plate 23. The cover plate is formed with an arcuate recess 24 within the compass of the side walls, which recess extends through an arc of substantially 90° from substantially the juncture of the rear wall 21 and side wall 20 to the juncture of the side wall 19 with the front wall 22. The peripheral edge of the top plate circumjacent to the recess 24 extends a substantial distance beyond the compass of the side walls to provide an overhanging flange 25, the under face of which is beveled inwardly to define a guide track 26.

Spaced vertical supports 26', 27 and 28 are mounted on the carriage adjacent the side 29 there of laterally of the platform 18, and the drive shaft 30 is mounted for rotation in horizontally aligning openings in the supports substantially laterally but slightly above the upper surface of the cover plate 23 of the platform. The reversible motor 31 is mounted on the carriage below and rearwardly of the drive shaft and is connected thereto through the medium of the endless belt 32.

A supporting bracket 33 is formed with a depending shank 34 which extends through the bore 35 in the cover plate of the platform. The shank is securely held within the bore by means of the washer 36 and cotter key 37 in a manner to pivotally associate the support with the platform and to permit the same to be freely movable about a vertical axis. A segmental gear 57 is connected to the support 33 by right-angularly disposed radially extending arms 58 and 59. The peripheral teeth of the gear are engageable with the helical worm 60 which is fixedly secured to the drive shaft 30 for rotation therewith whereby rotation of the shaft will pivotally actuate the carriage. The support includes spaced upstanding flanges 38 and 39 between which the supporting arm 40 is pivoted intermediate its ends for movement about a horizontal axis. The end 41 of the arm at one side of the pivot normally extends a substantial distance laterally of the carriage to support the clam-shell bucket 42 fastened thereto by means of the pivoted depending link 51.

The bucket 42 is formed with hingedly connected semi-cylindrical shells 43 and 44. Each of the shells is fashioned from a plurality of spaced arcuately curved rods 45 the upper ends of which are carried by the hinge pintle 46 and the lower ends thereof are connected to the cutting bars 47. The working faces 48 of the bars are beveled, as illustrated in Figure 11, and provide a cutting means when it is desired to sever the tops of the vegetables from the roots, or when it is necessary for the shells to dig into the ground to remove vegetables growing therein. Bands 49 connect the extremities of the cutting bars with the hinge pintle and a plurality of spaced rods 50 close the ends of the shells.

The end 52 of the arm 40 extends for a substantial distance beyond the pivot and is formed with a downwardly extending portion 53 which terminates in an inwardly disposed tip 54. The roller 55, rotatably mounted on the inwardly extending tip 54 of the arm, is adapted to pass through the radial slot 56 in the arm 59 to engage with the track 26, as illustrated in Figures 2 and 4.

The bucket operating mechanism comprises an actuating arm 61 pivotally mounted intermediate its ends on the end 41 of the supporting arm and adjacent its pivot point. The bifurcations 62 of the arm 61 extend laterally of the supporting arm at opposite sides thereof and are fixedly connected for mutual operation by the pivot pin 72. The toggles 63 are pivoted to the extremities of the bifurcations and to the shells 43 and 44 of the bucket 42. The pivoted arm 64 of each toggle is connected to the shell 44 and the pivoted arm 65 thereof is connected to the shell 43, whereby rocking of the forward bifurcated portion 62 of the arm 61 downwardly in the direction of the bucket will effect opening of the same, as illustrated in Figure 1, and, conversely, pivotal movement of the lever upwardly in a direction away from the bucket will effect closing of the same, as illustrated in Figure 2.

The portion 66 of the arm 61 extends rearwardly of the pivot 72 and terminates in a segmental gear 67 which meshes with the pinion 68 carried by the drive shaft 30 and rotatable with the worm 60. The teeth of the gear 67 are beveled as at 69 and 70 and the outer edge of the pinion 68 is beveled as at 71. The teeth of both the gear and pinion are deep cut and the beveled edges of the same permit the gear to easily mesh with the pinion during rotation of the pinion.

The rearwardly extending portion 66 of the arm 61 is spaced laterally of the rearwardly extending end 52 of the supporting arm 40 and carries a U-shaped bracket 73 the angularly disposed ends 74 and 75 of which extend in embracing relation with the end 52 of the supporting arm. The adjusting screw 76 extends through the lower end 75 of the bracket and the end 52 of the supporting arm to permit adjustment of the tension of the coil spring 77 interposed between the end 52 of the supporting arm and the end 74 of the bracket. The resilient action of the spring 77 normally acts to urge the rearward portions 66 and 52 of the arm 61 and supporting arm 40 in a direction away from each other. The separation of the arms is limited by the engagement of the lower end 75 of the bracket with the underside of the supporting arm, and the extent of separation may be finely determined by means of the screw 76. When positioned in the above manner, the forward portions 62 of the bucket operating levers will assume the position illustrated in Figure 1 to open the bucket 42.

The end 52 of the supporting arm carries an upstanding flange 78 to which the catch 79 is pivotally mounted. When the bucket is open, the arm 80 of the catch is positioned between the end portion 66 of the bucket operating arm and the end 52 of the supporting arm to compress the coil spring 81 interposed between the arm 80 and and the abutment 82 formed on the supporting arm. The arm 83 of the catch is arcuately bent to extend around the supporting arm and with the extremity thereof disposed a substantial distance therebelow, as clearly illustrated in Figure 5.

The motor is preferably a single phase reversing motor and the reversing switch 84 is mounted on the wall 19 of the platform in a manner to be engaged by the bell crank lever 85 carried by the shank 34 of the supporting bracket 33. The arms of the bell crank lever contact the switch levers 86 and 87 of the reversing switch to reverse the direction of rotation of the motor during the actuation of the supporting bracket 33. A manually operated switch 88 is mounted on the platform 18 and connected to the main lead of the motor, whereby closing of the switch will start the motor and permit continuous actuation of the same until the switch is opened to break the flow of electric current to the motor.

The operation of the device is as follows:

If it is assumed that the shovel is in the lowered open position, as illustrated in Figure 1, and that the switch 88 is closed to start the motor, the drive screw 60 and pinion 68 will be caused to rotate and to, consequently, drive the segmental gears 57 and 67, respectively. Two revolutions of the power shaft 30 will cause the pinion 68 to traverse the entire length of the segmental gear 67, while the segmental gear 57 will have been simultaneously advanced a distance corresponding to the distance between two of its teeth. The advancement of the segmental gear 57 by two of its teeth will move the segmental gear 67 to the position illustrated by the full lines in Figure 2, whereby the beveled edge 69 of the gear will disengage from the beveled edge 71 of the pinion. As the gear 67 starts to move in a downward direction, by virtue of the rotation of the pinion 68, the bucket operating arm 61 will be pivoted about the pivot pin 72 to elevate the forward portion 62 thereof and to extend the toggle 63 in a manner to close the bucket 42.

As the arm 61 pivots about the pivot pin 72, the rearward portion 66 thereof will move toward the rearward end 52 of the supporting arm a sufficient distance to permit the resilient action of the coil spring 81 to force the arm 80 of the catch 79 into superjacent relation therewith. When the lever is in the above-described position, the bucket will be held closed and the arm 61 will be prevented from having a free independent movement relative to its supporting arm. When the arm 61 is thus fixedly associated with the supporting arm 40, further actuation of the segmental gear 67 by the pinion 68 will pivotally actuate the supporting arm to raise the bucket to the position illustrated in Figure 2 and to lower the rearward end 52 thereof to move the roller 55 into engagement with the track 26 of the platform.

Figure 8 clearly illustrates the travel or the path taken by the roller. By virtue of the relatively rapid manner in which the pinion will traverse the gear 67 as compared with the speed of rotation of the horizontally disposed segmental gear 57, the roller will be moved downwardly with substantially greater rapidity than it will be moved laterally whereby its resultant direction of travel will be downwardly and forwardly substantially as defined by the lines 89 of Figure 8. The roller will be received by the radial slot 56 in the arm 59 of the gear 57, and the edge 90 of the flange 25 is beveled, as at 91, whereby the roller may pass below the flange, and as the gear 57 is advanced a sufficient distance to disengage the gear 67 from the pinion 68, reverse pivotal movement of the supporting arm relative to the supporting bracket 33 will be prevented by the advancement of the roller along the track 26 by continued movement of the segmental gear 57.

As the gear 57 is moved in the direction of the arrow in Figure 3 by the worm drive 60, the supporting bracket 33 will be pivoted about a vertical axis and the bucket 42 will consequently be moved through an arc of substantially 90° to overhang the receptacle 14. As the shovel passes over the open top of the receptacle, the depending end 83 of the catch 79 will engage the trip block 92 to move the arm 80 out of engagement with the rearwardly extending portion 66 of the bucket operating arm. Disengagement of the catch from the arm will permit the resilient action of the coil spring 77 to rock the arm about the pin 72 and to lower the forward portion 62 thereof in a manner to compress the toggle 63 and to open the bucket 42 and to cause the vegetables within the bucket to fall into the receptacle.

As the gear 57 reaches the extremity of its rotation and assumes the position as illustrated by the dotted lines in Figure 3, an arm of the bell crank lever 85 will engage the switch arm 87 of the motor to reverse the rotation of the same and to reversely actuate the gear 57 to swing the bucket to its initial position laterally of the carriage.

As the gear 57 approaches the termination of its rotation in a reverse direction the vertically disposed segmental gear 67 will be caused to mesh with the pinion 68, and the meshing of the gear 68 with the rotating pinion will cause the forward portion 41 of the supporting arm 40, and consequently the open bucket 42, to be pivoted to the lowered position, as illustrated in Figure 1.

It may thus be seen that if the device is being used to dig up vegetables such as carrots, beets, turnips, potatoes, or similar tuber-propagated vegetables, the carriage may be directed so that the beveled edges 48 of the shells 43 and 44 of the bucket will be disposed at opposite sides of the row of plants when in the lowered position.

As the segmental gear 57 reaches the position as illustrated by the full lines in Figure 3, an arm of the bell crank lever 85 will engage the switch arm 86 of the reversing switch to reverse the direction of rotation of the motor and to effect the closing of the bucket whereby the beveled edges of the bars 47 will dig into the ground and remove the tubers. The motor is energized by closing the master switch 88 and, once started, the bucket will be automatically operated in the manner above described without further manual control. If the device is to be used to pick or pull vegetables growing above the surface of the ground such as cabbages, or cauliflower, the rubber caps 93 and 94 may be clamped over the beveled edges 48 of the cutting bars 47, as clearly illustrated in Figure 12, whereby closing of the bucket will cause the caps to engage an opposite side of the vegetable and upon elevation of the bucket, the vegetable will be pulled from the ground and deposited in the receptacle in the manner hereinbefore described.

It is to be understood that the form of my invention, herewith shown and described, is to be taken as a preferred example of the same, and that various changes in the size, shape and arrangement of parts may be resorted to without departing from the spirit of my invention, or scope of the appended claims.

Having thus described my invention, I claim:

1. A harvester comprising a carriage; a receptacle mounted on the carriage; a clam-shell bucket; a supporting structure carrying the bucket and mounted on the carriage to swing in a vertical and a horizontal plane; a mechanism pivoted to the supporting structure and cooperative with the bucket to open and close the same; and an actuating means having a driving connection with the bucket operating mechanism to close the bucket and with the supporting structure to swing the same in a vertical plane to elevate the bucket and to simultaneously swing the said structure horizontally to position the bucket above the receptacle.

2. A harvester comprising a carriage; a receptacle mounted on the carriage; a clam-shell bucket; a supporting structure carrying the bucket and mounted on the carriage to swing in a vertical and a horizontal plane; a mechanism pivoted to the supporting structure and cooperative with the bucket to open and close the same; an actuating means having a driving connection with the bucket operating mechanism to close the bucket and with the supporting structure to swing the same in a vertical plane to elevate the bucket and to simultaneously swing the same horizontally to position the bucket above the receptacle; a clamp operative upon closing of the bucket to hold the same closed; and means engageable with the said clamp to release the same and to permit opening of the bucket upon movement of the bucket to a position above the receptacle.

3. A harvester comprising a carriage; a receptacle mounted on the carriage; a clam-shell bucket; a supporting structure carrying the bucket and mounted on the carriage to swing in a vertical and a horizontal plane; a mechanism pivoted to the supporting structure and cooperative with the bucket to open and close the same; a motor driven drive means cooperative with the bucket closing mechanism to close the bucket and with the supporting structure to swing the same in a vertical plane to elevate the bucket and to simultaneously swing the said structure horizontally to position the bucket above the receptacle; a trip means cooperative with the bucket operating mechanism to open the bucket when the same moves to a position above the receptacle; and a reversing switch connected to the motor and adapted to be operated by parts of the said supporting structure at the extremities of its horizontal swing to reverse the direction of rotation of the motor.

4. A harvester comprising a carriage provided with an arcuate track; a power driven screw mounted on the carriage, a circular gear rotatable with the said screw; a support pivoted to the carriage to swing about a vertical axis, said support including a segmental gear having a driven connection with the screw; an arm pivoted to the support, said arm being adapted to swing about a horizontal axis and having one end extending beyond its pivot and engageable with the said track; a clam-shell bucket suspended from the end of the arm remote from the track engaging end; a bucket operating mechanism rockably mounted on the arm adjacent its pivot and including a segmental gear having a driven connection with the said circular gear; and clamp means automatically operable to connect the bucket operating mechanism with the arm upon closing of the bucket, whereby rotation of the circular gear will rock the bucket operating mechanism to close the bucket and to connect the same to the said arm and to then swing the arm about its horizontal axis to elevate the bucket and to move the track engaging end of the arm into engagement with the track, said screw simultaneously acting on the segmental gear of the support to swing the same about its vertical axis and to move the second segmental gear out of engagement with the circular gear.

5. A harvester comprising a carriage including an arcuate track; a clam-shell bucket; a supporting structure carrying the bucket and mounted on the carriage to swing in a vertical and a horizontal plane, said supporting structure including a track engaging part; a mechanism pivoted to the supporting structure and cooperative with the bucket to open and close the same; and an actuating means having a driving connection with the bucket operating mechanism to close the bucket and to swing the supporting structure in a vertical plane to elevate the bucket, said actuating means simultaneously coacting with the supporting structure to swing the same horizontally to move the track engaging end into engagement with the track.

6. A harvester comprising a carriage including an arcuate track; a clam-shell bucket; a supporting structure carrying the bucket and mounted on the carriage to swing in a vertical and a horizontal plane, said carriage including a track engaging roller; a mechanism pivoted to the supporting structure and cooperative with the bucket to open and close the same; a motor driven actuating means having a driving connection with the bucket operating mechanism to close the bucket and to swing the supporting structure in a vertical plane to elevate the bucket, said actuating means simultaneously coacting with the supporting structure to swing the same horizontal to move the track engaging roller into engagement with the track; and switch means connected to the motor driven actuating means and adapted to be engaged by parts of the said supporting structure at the extremities of its horizontal swing to reverse the direction of rotation of the said motor.

7. A harvester comprising a carriage; a clam-shell bucket; a supporting structure carrying the bucket and mounted on the carriage to swing in a vertical and a horizontal plane; a mechanism pivoted to the supporting structure and cooperative with the bucket to open and close the same; spring means to normally hold the bucket in an open position; and an actuating means having a driving connection with the bucket operating mechanism to close the bucket against the resilient action of the spring means and to swing the supporting structure in a vertical plane to elevate the bucket, said means being connected with the supporting structure to simultaneously swing the same horizontally.

MICHAEL EVELEV.